United States Patent [19]
Bryngdahl

[11] 3,791,275
[45] Feb. 12, 1974

[54] MULTIPLE IMAGE FORMATION THROUGH SELF-IMAGING

[75] Inventor: Olof Bryngdahl, Cupertino, Calif.

[73] Assignee: Xerox Corporation, Stamford, Conn.

[22] Filed: Oct. 17, 1972

[21] Appl. No.: 298,204

[52] U.S. Cl............. 95/18 R, 95/1 R, 350/162 ZP, 355/46
[51] Int. Cl............................................ G03b 35/08
[58] Field of Search .... 95/18 R, 1 R; 355/2, 18, 46; 350/162 R, 162 ZP

[56] References Cited
UNITED STATES PATENTS
3,545,854  12/1970  Olsson................................. 355/46
3,584,948  6/1971  Herriott............................ 355/46 X OTHER PUBLICATIONS
"Fresnel Zone Plate for Optical Image Formation Using Extreme Ultraviolet and Soft X Radiation" by Albert Baez, Journal of the Optical Soc. of America, pp. 405–412, Apr. 1961.
"Zone Lens Array for Fabrication of Multipe–Image Patterns" by H. R. Rottmann et al., IBM Technical Disclosure Bulletin, pg. 48, Vol. 9, No. 1, June 1966.

*Primary Examiner*—Richard L. Moses

[57] ABSTRACT

The present invention relates to the formation of multiple images by self-imaging. Individual points of an incoherently illuminated object serve as sources to achieve self-images of a pinhole array. By using an incoherent, monochromatic light source to illuminate a single object, a plurality of pinholes in a periodic structure allows for the production of sharpened images at defined locations from the structure. At certain defined locations, Fresnel images are formed which are true images of the object numbering higher than said plurality of pinholes.

12 Claims, 3 Drawing Figures

MULTIPLE IMAGE FORMATION THROUGH SELF-IMAGING

BACKGROUND

This invention relates to a method and apparatus for forming multiple images of a single object, and more particularly to such multiple image formation through self-imaging techniques.

Multiple images of a single object are known to be formed by various methods and apparatus that either divide the wavefronts of reflected light beams or their amplitudes. For example, mirrors, lenses, and pinhole arrays divide wavefronts; while beam splitters such as partially reflecting mirrors, berefringement crystals, and gradings divide amplitudes. More recently, holographic procedures have been used to construct multiple images of a single object illuminated with a light source. The common element of these holographic procedures is a hologram from which an array of point images is reconstructed when illuminated with a point source. Replacing the point source by an extended object results in an array of images of this object.

Self-imaging of periodic objects in coherent light is a well-known phenomenon. Illumination of an object repeated in two orthogonal directions (period = $d$) with collimated light (wavelength = $\lambda$) results in images (Fourier images) of the periodic object in planes at distances $z = 2vd^2/\lambda$ from the object ($v$ = integer). If the object array is illuminated with a point source located at a distance $z_0$ in front of the object, the planes with the Fourier images are given by $1/z_0 + 1/z = \lambda/(2vd^2)$ for a square array and $1/z_0 + 1/z = 2\lambda/(3vd^2)$ for a hexagonal array. Between these planes so defined, Fresnel images are formed which are not true images of the object. The locations of these planes are obtained by replacing $v$ in the formula above with $v + N/n$, where n and N are integers with no common factor.

These arrangements, however, require a complexity of apparatus and techniques to achieve multiple images of a single object. Moreover, the prior art self-imaging techniques are limited to illuminating the object with a coherent light source for the formation of images of the periodic object at certain distances away from the object.

It is thus an object of the present invention to provide an alternative self-imaging method and apparatus for forming multiple and identical images of a single object in a more simplified manner.

It is the further object of the present invention to form multiple images by using a self-imaging technique to obtain an array of identical images.

It is yet another object of the present invention to form multiple images of a single object by illuminating the object with spacially incoherent, monochromatic light.

It is still another object of the present invention to provide sharpened self-images of a single object by using incoherent, monochromatic light in combination with a periodic array of pinholes.

It is also an object of the present invention to provide a multiplication of pinhole images which are generated from individual points of an incoherently illuminated object.

Other objects of the invention will be evident from the description hereinafter presented.

SUMMARY OF THE INVENTION

The invention provides an incoherent, monochromatic light source to illuminate a single object so that individual points of the object may serve as sources to achieve self-images of a pinhole array located in proximity to the object. The pinhole array is a periodic structure comprised of a plurality of pinholes equidistant from one another which allows for the production of sharpened images at defined locations from the array.

A feature of the invention is that the periodic structure contains a minimum number of pinholes which provide images of the object, which consists of more than one image-producing point. Information contained in the self-images produced includes the relative locations between the image-producing points. Since it is desirable that each image produced be at least two dimensional, it is then theoretically required that the periodic structure contain at least three pinholes.

Another feature of the invention is that at other certain defined locations, Fresnel images are formed which are also true images of the object which number greater than the number of pinholes.

It is still another feature of the invention that the plurality of pinholes are coplanar and that thus the periodic structure is a plane. The Fourier images and Fresnel images are formed in respective planes, parallel to said plane including the pinhole array, at their certain defined locations from the pinhole array.

Yet another feature of the invention provides a pinhole array in one face of an enclosed housing. The object, outside of said housing and optically associated with the pinhole array, is illuminated by an incoherent, monochromatic light source. Within the housing are formed Fourier and Fresnel images. An exposure plane within the housing may be designed so as to cooperate with the apertured face of the housing such that either the Fourier images or the Fresnel images are formed upon it. Alternatively, incoherent, polychromatic light could be used to illuminate the object so long as a suitable filter were employed in combination with the pinhole array to pass only monochromatic light into the housing through the pinholes.

These and other features which are considered to be characteristic of this invention are set forth with particularity in the appended claims. The invention itself, however, as well as additional objects and advantages thereof, will best be understood from the following description when considered in conjunction with the accompanying drawings.

DESCRIPTION OF THE PREFERRED EMBODIMENT

Figure 1:
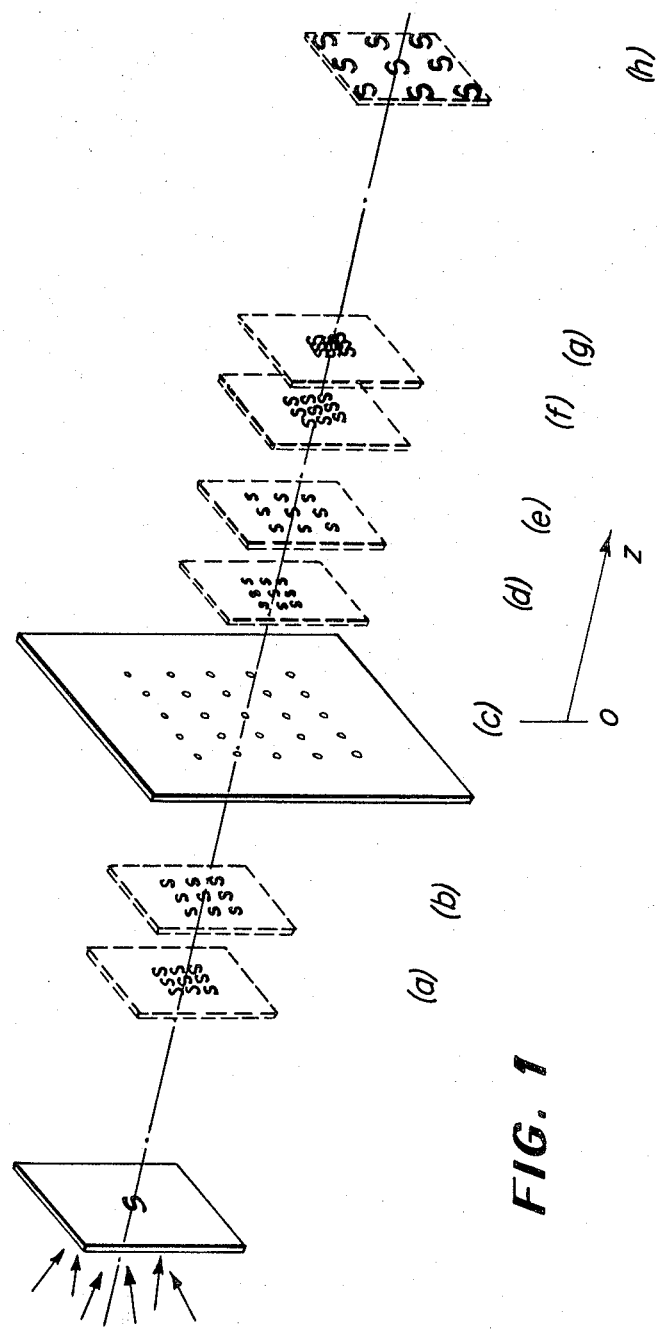
FIG. 1 is a schematic drawing of a self-imaging system which embodies features of the invention.

In FIG. 1 is shown a self-imaging system in accordance with the invention. An object S is located in a source plane 1. An object plane 2 is located at a distance $z_0$ from the source plane 1. The object plane 2 is, in this preferred embodiment, a sheet of opaque material which contains a plurality of pinholes which are equidistant from one another. To practice the invention, any periodic structure which is comprised of a plurality of pinholes could be substituted for the object plane 2. Spacially incoherent, monochromatic illumination of the source plane 1 will produce an array of images of the object S.

The source plane 1 may be illuminated by any number of optical convolutions which produce incoherent, monochromatic light. For example, a laser may be used as a source of monochromatic light in combination with a rotating ground glass to produce the requistite incoherent, monochromatic light. An alternate light source would be a mercury arc lamp. Still another would be illumination of the object S by natural light in combination with suitable filtering to provide the incoherent, monochromatic illumination.

The images produced by the optical system of FIG. 1 are of two types which have been given definition in the background portion of this application. Fourier images and Fresnel images are formed at their respective locations, which are defined by the usual formulations. The Fourier images are true images of the object S which number the same as the number of pinholes in the object plane 2. The Fresnel images are also true images of the object S which number greater than the number of pinholes in the object plane 2. In the preferred embodiment, the Fourier images and Fresnel images are formed in respective planes, parallel to the object plane 2. In FIG. 1, the images at location ($a$) are Fourier images; whereas the remaining images are Fresnel images.

An object S with a height D of approximately 200 micro inches and a photographically produced $55 \times 55$ square pinhole array as the object plane 2, with a period $d = 275$ micro inches and an average hole diameter of 40 micro inches, have been successfully used to practice the invention. Using the formulas given in the background of the invention, one may predict the location of the Fourier and Fresnel images. In FIG. 1, the source plane 1 is located at a distance $z_o$ from the object plane 2. The images produced are located at a distance z from the object plane 2, as given in Table 1. The unit cell in the Fresnel image array has been found to be reduced by a factor m compared to that of the Fourier images. Thus, in the Fresnel image planes of a square array there exists a multiplicity $m^2$ of the original pattern. The unit cell magnification is given by $(z+z_o)/(mz_o)$ and the image magnification is given by $|z|/z$. Therefore, a unit cell or image multiplication may be realized with the Fresnel images of $m \leq (d/D) (2+z_o)/|z|$ without overlapping images.

TABLE 1

| Figure | v | n | N | m | z in mm |
|---|---|---|---|---|---|
| 2(a) | −1 | | 1 | 1 | −136 |
| 2(b) | −1 | 2 | 1 | 1 | −94 |
| 21(c) | pinhole array | ($z_o = 250$ mm) | | | 0 |
| 2(d) | 0 | 6 | 1 | 3 | 60 |
| 2(e) | 0 | 4 | 1 | 2 | 102 |
| 2(f) | 0 | 3 | 1 | 3 | 161 |
| 2)g) | 0 | 8 | 3 | 4 | 196 |
| 2(h) | 0 | 2 | 1 | 1 | 355 |
| 3(a) | pinhole array | ($z_o = 290$ mm) | | | 0 |
| 3(b) | −1 | | | 1 | −104 |
| 3(c) | −2 | | | 1 | −152 |

Figure 2:
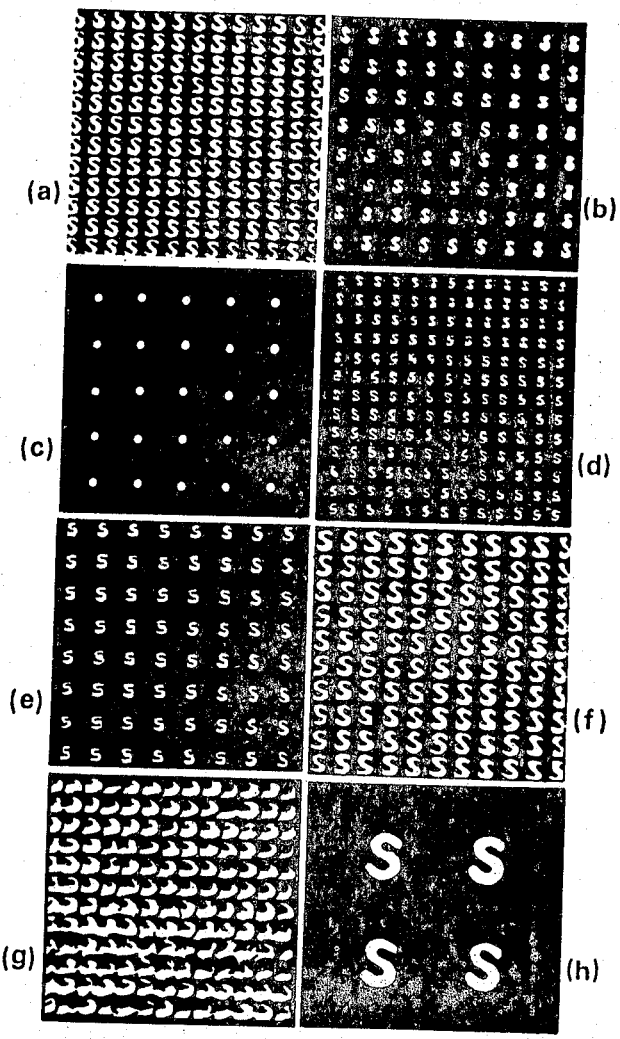
FIG. 2 shows the irradiance distributions in different planes of the self-imaging arrangement shown in FIG. 1.
Figure 3:
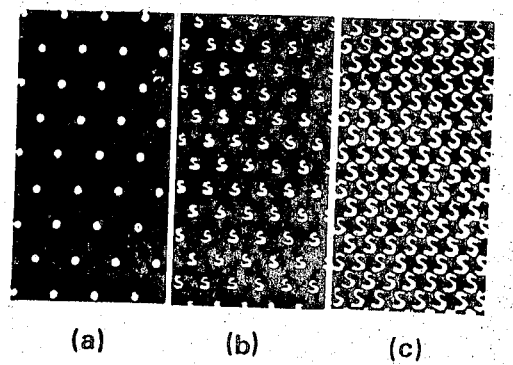
FIG. 3 shows Fourier images in different planes resulting from the use of a hexagonal pinhole array.

FIG. 2 shows the actual relationship of images produced with the above array in combination with 5145A light from an Ar laser which is imaged onto the object S by means of a rotating ground glass. The number of high contrast images are $165 \times 165$ in case ($d$) $109 \times 109$ ($e$), and $61 \times 61$ in ($b$). The images of FIG. 2, identified by their respective locations, are only a few of the various image combinations which are possible in practicing the invention. The invention may also be practiced by using various shapes of pinhole arrays. For example, a hexagonal pinhole array with a period $d = 235$ microns and a hole diameter of 35 microns when substituted for a square array results in images shown in FIG. 3, at the respective locations.

The invention provides a powerful optical tool to create multiple images. A single object distribution and a generalized pinhole array $p \times p$ can display $m^2(p \times p)$ Fresnel images of the object, where m can easily obtain values of 5 or higher. Another significant advantage is that extremely sharp images are created in both the Fourier and Fresnel image planes. In the preferred embodiment, at least three holes are theoretically desirable to form the pinhole array since the formation of self-images will then have at least two dimensions of information content. With this minimum configuration, the production of true images of the original object is insured for the practical application of these images.

One significant application would provide a pinhole array in one face of an enclosed housing. The object would be located outside of the housing and be optically associated with the pinhole array. The object would be illuminated by an incoherent, monochromatic light source. Within the housing are formed Fourier and Fresnel images. An exposure plane within the housing may be designed so as to cooperate with the apertured face of the housing such that the Fourier images or the Fresnel images are formed upon it. Such an application would be suitable for X-ray photography where the light source would be the X-rays themselves. The employment of the present invention would obtain sharper images of the object than otherwise obtained, since lenses cannot be employed in X-ray optical systems.

An alternate arrangement which would obviate the need and function of lenses within an optical system would be a general purpose pinhole camera. The conventional pinhole camera with a single aperture for image production results in only a single image of generally poor quality. Therefore, in prior art systems it is required to utilize a lens in the image producing aperture for focusing to a sharp image. By employing the teachings of this invention sharply defined self-images may be produced by a plurality of pinholes as image-forming apertures without the need for a lens. If incoherent, polychromatic light, such as neutral light, is used to illuminate the object, a filter would be employed to fill the pinholes such that only monochromatic light passes into the camera housing.

The image-producing features of this invention may also be employed to take advantage of the multiplication of images in the Fresnel image planes. For example, the multiplication of images would be useful in optical computations, comparisons in the field of pattern recognition, and integrated circuit production in which a single mask may be illuminated with the subsequent multiple image production for the simultaneous etching of a multiplicity of circuit boards.

Obviously, many modifications of the present invention are possible in light of the above teaching. It is therefore to be understood that, in the scope of the appended claims, the invention may be practiced other than as specifically described.

What is claimed is:

1. An optical system for the formation of multiple images of a single object comprising means for producing an incoherent, monochromatic irradiance from a single object and a planar structure having a periodic array of apertures responsive to the irradiance from said object to form multiple, identical images of said object in various image planes at predetermined distances from said structure.

2. The system as claimed in claim 1, wherein certain of said image planes are comprised of Fourier images and the remainder of said image planes are comprised of Fresnel images.

3. The system as claimed in claim 2, wherein said Fresnel images are optically true images of said object and the images in each of said image planes number higher than the number of apertures in said structure.

4. The system as claimed in claim 3, wherein said array of apertures comprises at least three pinholes.

5. The system as claimed in claim 4, wherein said irradiance means comprises an incoherent light source in convolution with said object and filtering means for rendering said irradiance monochromatic.

6. The system as claimed in claim 4, wherein said irradiance means comprises an Ar laser and a rotating ground glass in convolution with said object.

7. A camera for forming self-images of a photographed object comprising a housing comprising at least one face optically associated with the object, said face being formed of a planar structure having a plurality of apertures in periodic relationship to one another, and means for incoherently illuminating said object and irradiating said face with an incoherent, monochromatic radiation to form self-images of said object in various image planes at predetermined distances from said face.

8. A method of forming multiple images of a single object comprising the steps of illuminating the object with incoherent, monochromatic radiation such that individual points of the object are sources of secondary radiation, positioning a planar structure which has a periodic array of apertures at a distance from said object, and irradiating said structure with the secondary radiation to form multiple, identical images of said object in various image planes at predetermined distances from said structure.

9. The method as claimed in claim 8, wherein certain of the image planes are comprised of Fourier images and the remainder of said image planes are comprised of Fresnel images.

10. A method of forming multiple images of a single object comprising the steps of illuminating the object with a source of incoherent radiation such that individual points of the object are sources of secondary radiation, positioning a planar structure which has a periodic array of apertures at a distance from said object, filtering either of said radiations to provide monochromatic secondary radiation, and irradiating said structure with the secondary radiation to form multiple, identical images of said object in various image planes at predetermined distances from said structure.

11. The method as claimed in claim 9, wherein the Fresnel images formed are optically true images of said object and the images in each of the image planes number higher than the number of apertures in said structure.

12. The method as claimed in claim 10, wherein certain of the image planes are comprised of Fourier images and the remainder of said image planes are comprised of Fresnel images.

* * * * *